May 10, 1949.　　　　　　　　L. E. ASKE　　　　　　　　2,469,808
INDUCTION MOTOR ROTOR

Filed Sept. 28, 1946　　　　　　　　　　　　　　　　　3 Sheets—Sheet 1

INVENTOR,—
LEONARD E. ASKE
BY Arthur R. Wylie
ATTY.

May 10, 1949.  L. E. ASKE  2,469,808
INDUCTION MOTOR ROTOR
Filed Sept. 28, 1946  3 Sheets-Sheet 2
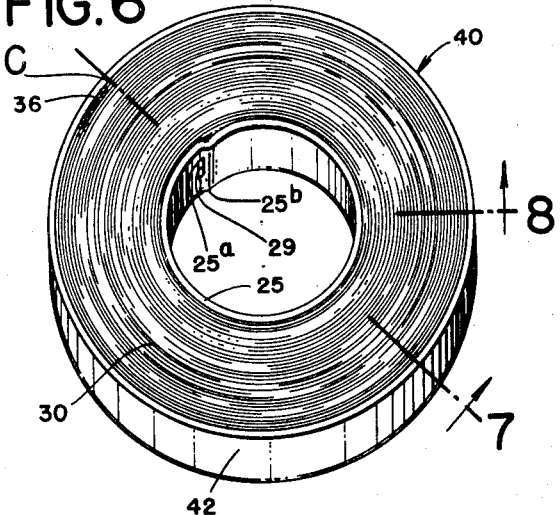
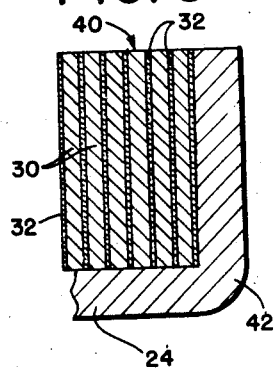
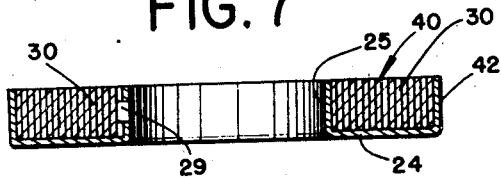
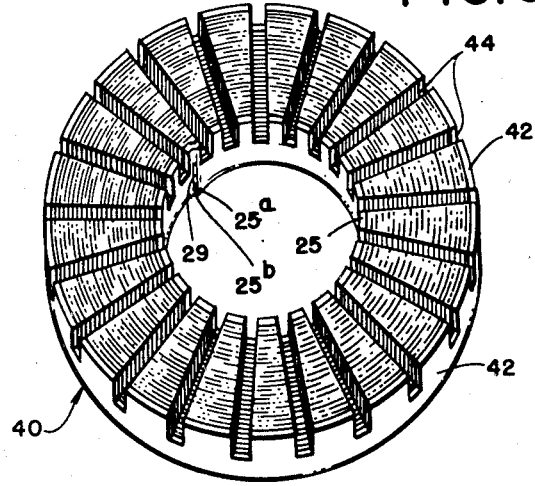
INVENTOR:-
LEONARD E. ASKE
BY Arthur R. Wylie ATTY.

May 10, 1949.   L. E. ASKE   2,469,808
INDUCTION MOTOR ROTOR

Filed Sept. 28, 1946   3 Sheets-Sheet 3

INVENTOR:-
LEONARD E. ASKE
BY *Arthur R. Urquhart* ATTY.

Patented May 10, 1949

2,469,808

UNITED STATES PATENT OFFICE 2,469,808

INDUCTION MOTOR ROTOR

Leonard E. Aske, Minneapolis, Minn., assignor to General Mills, Inc., a corporation of Delaware Application September 28, 1946, Serial No. 700,141

14 Claims. (Cl. 172—120)

An object of this invention is the provision of an open faced, caged rotor for induction motors of the "pancake" type and of a method of making them.

Other objects as will hereinafter appear are fully described in the following specification as shown in the accompanying drawings in which Figure 1 is a transverse view through a face plate or winding of the rotor, and showing the rotor at the beginning of the winding;

Fig. 6 is a perspective view of the rotor core showing the disc on which it is wound pressed inwardly about the wound core so as to encase it on three sides;

Fig. 7 is a transverse section on the line 7 of Fig. 6;

Fig. 8 is a partial enlarged section on the line 8 of Fig. 6;

Fig. 9 is the standard core of Fig. 6 with a series of radial slots formed therein previously by milling;

The embodiment illustrated comprises the wound rotor which will be described, as well as the method of winding, assembling and mounting of same in an induction motor of the "pancake" type.

Figure 1:
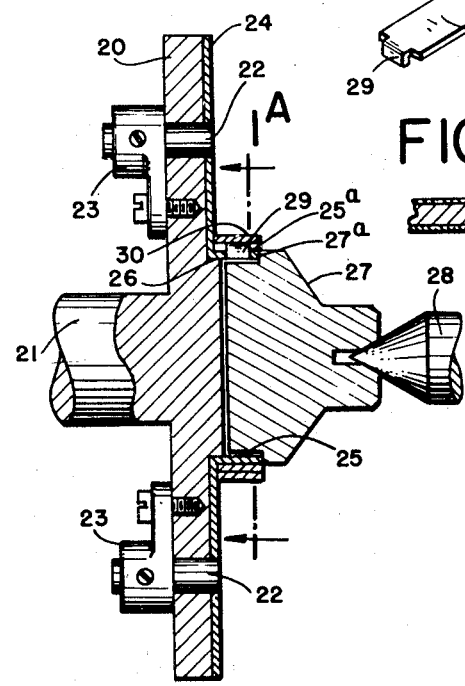
Figure 1A is a front elevation of the wound rotor of Fig. 1 showing the steel ribbon about to be severed.
Figure 2:
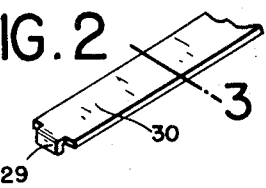
Fig. 2 is a partial, perspective view of the starting end of the steel ribbon which is wound to make the rotor core.
Figure 3:
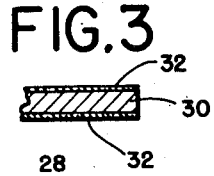
Fig. 3 is a partial enlarged section on the line 3 of Fig. 2.

The first step of the process is illustrated in Fig. 1 in which a lathe faceplate 20, mounted on a shaft 21, is provided with a plurality of drive pins 22 which are supported by brackets 23 and which pass through suitable openings in a disk 24 of copper, brass, non-magnetic stainless steel, aluminum, cold rolled steel and the like, which has a central, axial, upstanding, inner flange 25, which is accurately centered by means of a ledge 26 on the faceplate. A retaining member 27 is mounted for rotation on a lathe which is co-axial with the shaft 21. This retaining member extends within the upstanding flange 25 and has a shoulder 27a which retains the disk in place.

The flange 25 is provided with a slot 25a (Fig. 9) into which is fitted a narrowed and bent-up lug 29 on the end of a thin, electrical steel ribbon 30 which forms most of the magnetic core of the rotor. At the slot 25a the flange has a tapering depression 25b that at this point is equal to the thickness of the steel ribbon so as to render the winding more circular.

Figure 4:
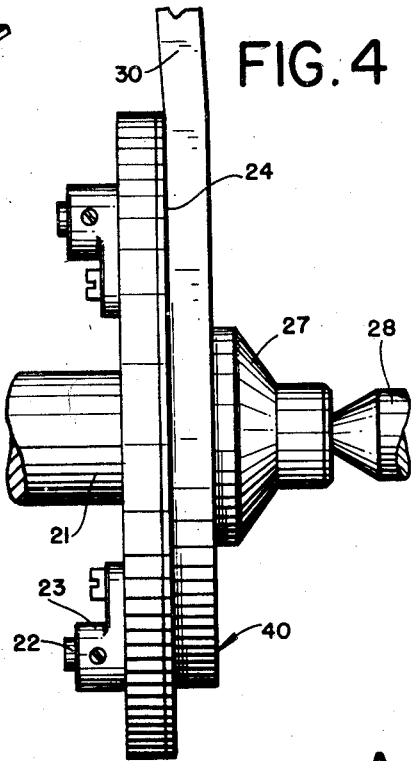
Fig. 4 is a side elevation of the part shown in Fig. 1 with the winding of the core nearing completion.
Figure 5:
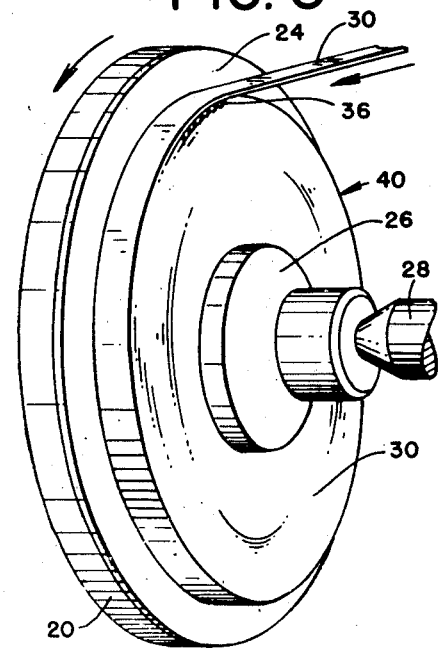
Fig. 5 is a perspective view of the parts of Fig. 4 showing the winding completed with the last layer of the steel ribbon soldered and ready to be severed.
Figure 1A:
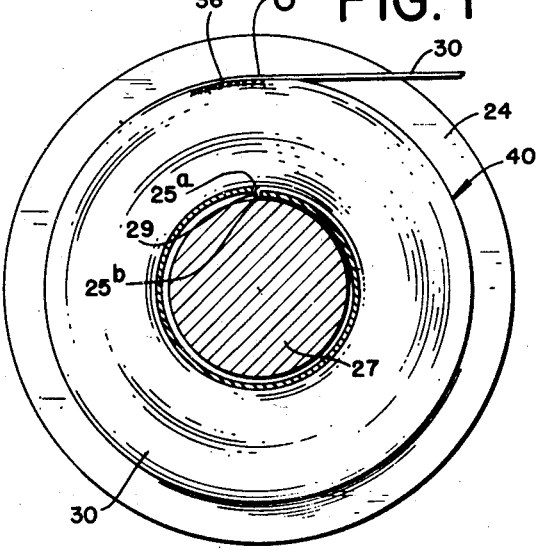

After the first turn or two have been put on, as indicated in Fig. 1 with moderate tension, the tension is increased on the ribbon 30 so that it is wound up very tightly. By keeping the ribbon pulled up against disk 24, as indicated in Fig. 4, the ribbon throughout its length tends to hug the disk 24 very closely. The ribbon which may be about .015" in thickness contains 1% to 5% of silicon and has been heat-treated to form silicon oxide on its surfaces which serves to insulate adjacent layers from each other in a well known manner. In addition, I preferably apply a very thin coating 32, about .0005" in thickness, of a suitable insulating cement which dries rapidly and which is later set by means of heat and pressure so as to bond the various layers of the rotor core more firmly together, as will later be explained.

After the winding is completed, and the desired number of turns of ribbon have been wound on the core, the last turn is secured by scraping adjacent, contiguous surfaces of the ribbon so as to remove any cement, and a fine silver solder 36 is then applied and heated so as to firmly secure the last two turns of the ribbon, thereby holding the entire wound core in place. The ribbon can then be cut, as indicated at C just beyond the silver solder and even with the lug 29 which is the start of the first turn of the steel ribbon.

The tailstock and the retaining member 26 are then removed, and the disk 24 with the core 40 wound thereon are then removed and placed in a press, not shown, which bends this outer portion of the disk up around the core 40 as shown at 42, Figs. 6, 7, and 8. This forming is done under high pressure so as to accurately center all the elements which go to make up the steel core of the rotor.

This rotor is then provided with a series of radial cuts 44 as shown in Fig. 9 which are previously formed by means of a milling cutter traveling radially inwardly. During this operation, the relatively heavy inner and outer flanges 25 and 42 serve to prevent tearing and fraying of the thinner steel ribbon 30 which goes to make up the body of the core 40.

To insure sealing of any opening which may be present, the radially slotted member as shown in Fig. 9 is now dipped in a good grade electrical insulating varnish and may be baked in a temperature-controlled oven.

Figure 10:
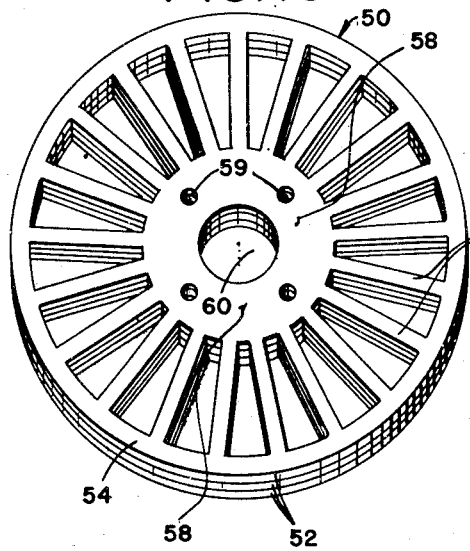
Fig. 10 is a spider composed preferably of copper.
Figure 11:
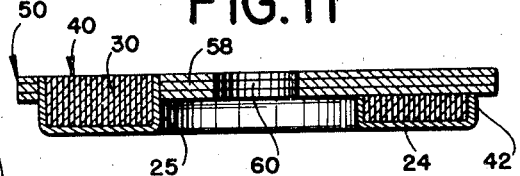
Fig. 11 is a section similar to Fig. 7 with the spider of Fig. 10 assembled in the radial grooves.
Figure 12:
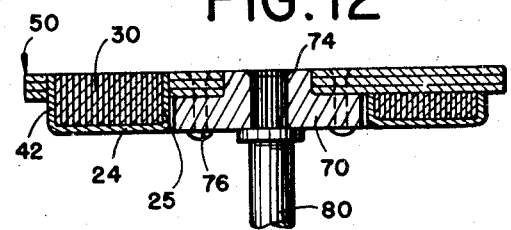
Fig. 12 is a section similar to Fig. 11, showing a means for mounting the shaft axially in the rotor.

Spider 50, as shown in Fig. 10, is then formed, preferably of a number of thicknesses 52 of copper or other metal which has a high electrical current-carrying capacity. This spider bears a general resemblance to a wheel with a rim 54, spokes 56, and center 58, with holes 59 and a central opening 60 whose purpose will presently be explained. The rim 54 fits closely around the outer sheath 42 while the spokes 56 form a press fit into the slots 44, and the center 58 fits tightly within the inner sheath 25. The thickness of the spider 50 is slightly greater than the depth of the radial slots 44 so that when heavy pressure is applied to the copper spider, it flows into intimate contact with the rotor core with the result that the whole is firmly bound together as shown in Figs. 11 and 12. Both faces are then machined to insure parallelism and flatness, and the periphery is machined.

This open faced caged rotor is then accurately centered in a fixture (not shown) after which the hole 60 is reamed to make it truly concentric. A steel hub 70 having a central boss 74 snugly fitting into this reamed hole and is retained by rivets 76 passing through the holes 59 and through registering holes in the steel hub. A splined shaft 80 is firmly pressed into the central opening in the hub 70. This arrangement insures a firm mounting for the rotor on the shaft 80.

Figure 13:
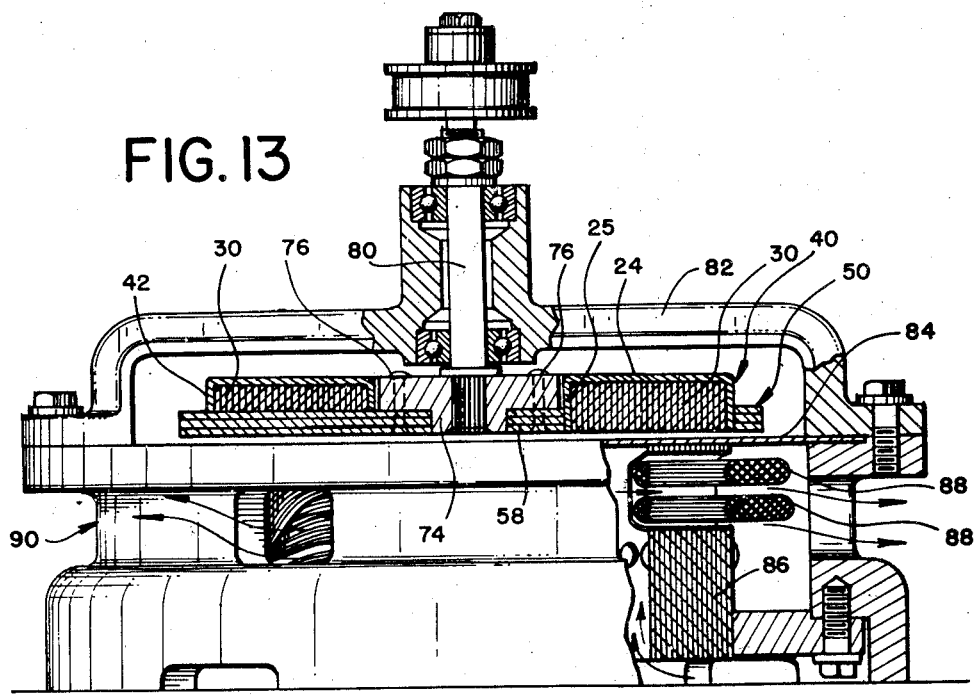
Fig. 13 is a side elevation, partly in section, of an induction motor and showing the rotor of Fig. 12 mounted therein.

In Fig. 13, the shaft 80 is mounted in suitable bearings in a frame 82 while a non-magnetic diaphragm 84, having a very high electrical resistivity, such as a sheet of thin, non-magnetic stainless steel, serves to separate the rotor 50 from the field core 86 of the induction motor 90. Means not shown are provided for circulating air through the field windings 88 to keep them properly cooled.

This type of pancake motor construction lends itself to separating the rotor from the stator by means of the seal-off diaphragm 84. Since the rotor of the motor is not subject to burning out or to the usual damage due to wear, it can be entirely enclosed and hermetically sealed. The stator on the other hand is likely to burn out or become damaged and hence is made replaceable by bolting it outside the diaphragm. This is particularly applicable to installations in refrigerators and the like where it is desirable that the rotor be entirely enclosed.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. A rotor for induction motors comprising a flat annular ring formed of a tight spirally wound band of electrical steel ribbon enclosed inside, outside and on one face by an annular metal cup having flanges tightly enclosing inner and outer surfaces of the annular ring, the open face of the ring having a series of radial slots formed therein, and a non-magnetic electrical spider having a hub, rim and spokes connecting the hub and rim, the spokes tightly fitting within the radial slots.

2. A rotor for induction motors comprising a flat annular ring formed of a tight spirally wound band of electrical steel ribbon enclosed inside, outside and on one face by an annular sheet metal cup having flanges tightly enclosing inner and outer surfaces of the annular ring, the open face of the ring having a series of radial slots formed therein, and a non-magnetic electrical spider having a hub, rim and spokes connecting the hub and rim, the spokes tightly fitting within the radial slots.

3. A rotor for induction motors comprising a flat annular ring formed of a tight, spirally wound band of electrical steel ribbon enclosed inside, outside and on one face by an annular sheet metal cup having flanges tightly enclosing inner and outer surfaces of the annular ring, the open face of the ring having a series of radial slots formed therein, a non-magnetic electrical spider having a hub, rim and spokes connecting the hub and rim, the spokes tightly fitting within the radial slots and a shaft secured axially to said hub.

4. A rotor for induction motors comprising a flat annular ring formed of a tight spirally wound band of electrical steel ribbon enclosed inside, outside and on one face by an annular metal cup having flanges tightly enclosing inner and outer surfaces of the annular ring, the open face of the ring and cup having a series of radial slots formed therein, and a non-magnetic electrical spider having a hub, rim and spokes connecting the hub and rim, the spokes tightly fitting within the radial slots.

5. A rotor for induction motors comprising a flat annular ring formed of a tight spirally wound band of electrical steel ribbon enclosed inside, outside and on one face by an annular metal cup having flanges tightly enclosing inner and outer surfaces of the annular ring, the open face of the ring having a series of radial slots formed therein, to substantially one-half the depth of the ring, and a non-magnetic electrical spider having a hub, rim and spokes connecting the hub and rim, the spokes tightly fitting within the radial slots.

6. The method of making a rotor of the class described comprising mounting a disk with a laterally extending cylindrical portion for axial rotation, tightly winding electrical steel ribbon about the cylindrical portion to form a core contiguous to the disk, subsequently forming the outer portion of the disk about the outer layer of the core to enclose the same, forming radial slots in the open face of the core, forming an integral spider of copper or the like with a central hub, radiating spokes and rim, pressing the spokes of the spider into the radial slots in the core while the hub and rim tightly contact the upstanding inner and outer flanges of the disk, and attaching a shaft axially to the disk.

7. The method of making a rotor of the class described comprising mounting a disk with a laterally extending cylindrical portion for axial rotation, tightly winding electrical steel ribbon about the cylindrical portion to form a core contiguous to the disk, subsequently forming the outer portion of the disk about the outer layer of the core to enclose the same, milling radial slots in the open face of the core, forming an integral spider of copper or the like with a central hub, radiating spokes and rim, pressing the spokes of the spider into the radial slots in the core while the hub and rim tightly contact the upstanding inner and outer flanges of the disk, and attaching a shaft axially to the disk.

8. The method of making a rotor of the class described comprising mounting a disk with a laterally extending cylindrical portion for axial rotation, tightly winding electrical steel ribbon about the cylindrical portion to form a core contiguous to the disk, subsequently forming the outer portion of the disk about the outer layer of the core to enclose the same, milling radial slots in the open face of the core to substantially one-half the depth of the core, forming an integral spider of copper or the like with a central hub, radiating spokes and rim, pressing the spokes of the spider into the radial slots in the core while the hub and rim tightly contact the upstanding inner and outer flanges of the disk, and attaching a shaft axially to the disk.

9. The method of making a rotor of the class described comprising the steps of winding electrical steel ribbon on a disk having a laterally extending inner cylindrical portion, with the ribbon tightly embracing the cylindrical portion to form a core contiguous to the disk, and subsequently deforming the outer portion of the disk laterally about the outer layer of the core to enclose the same.

10. The method of making a rotor of the class described comprising the steps of winding electrical steel ribbon on a disk having a laterally extending inner cylindrical portion, with the ribbon tightly embracing the cylindrical portion to form a core contiguous to the disk, fastening the outer layer of the core to the adjacent inner layer to prevent unwinding of the core, and then deforming the outer portion of the disk around the outer layer to enclose the core.

11. The method of making a rotor of the class described comprising the steps of mounting a disk with a laterally extending cylindrical portion for axial rotation, tightly winding electrical steel ribbon about the cylindrical portion to form a core contiguous to the disk, and subsequently deforming the outer portion of the disk laterally about the outer layer of the core to enclose the same.

12. A rotor for induction motors comprising a flat annular ring formed of a tight spirally wound band of electrical steel ribbon enclosed inside, outside and on one face by an annular metal cup having inner and outer flanges tightly enclosing inner and outer layers of the annular ring, the inner flange having a tapering depression underlying the inner end of the ribbon, the maximum depth of the depression being equal to the thickness of the ribbon.

13. A rotor for induction motors comprising a flat annular ring formed of a tight spirally wound band of electrical steel ribbon enclosed inside, outside and on one face by an annular metal cup having inner and outer flanges tightly enclosing inner and outer layers of the annular ring, the inner flange having a slot in which the inner end of the ribbon is anchored, the flange at one side of the slot having a tapering depression underlying the inner end of the ribbon.

14. A rotor according to claim 13 in which the depth of the depression immediately adjacent the slot is equal to the thickness of the ribbon.

LEONARD E. ASKE.

REFERENCES CITED

The following references are of record in the file of this patent:

UNITED STATES PATENTS

| Number | Name | Date |
| --- | --- | --- |
| 1,519,798 | Pilkington et al. | Dec. 16, 1924 |
| 1,897,184 | Zopp | Feb. 14, 1933 |
| 2,356,972 | Chubback | Aug. 29, 1944 |